US010037648B2

(12) United States Patent
Acres

(10) Patent No.: US 10,037,648 B2
(45) **Date of Patent: *Jul. 31, 2018**

(54) GAMING DEVICE WITH PERSONALITY

(71) Applicant: Patent Investment & Licensing Company, Las Vegas, NV (US)

(72) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,304

(22) Filed: Jun. 1, 2017

(65) Prior Publication Data

US 2017/0270741 A1 Sep. 21, 2017

Related U.S. Application Data

(63) Continuation of application No. 15/225,431, filed on Aug. 1, 2016, now Pat. No. 9,697,677, which is a continuation of application No. 14/158,518, filed on Jan. 17, 2014, now Pat. No. 9,430,898, which is a continuation of application No. 12/111,462, filed on Apr. 29, 2008, now Pat. No. 8,632,400.

(Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |
| ***G07F 17/42*** | (2006.01) |
| ***G07F 17/34*** | (2006.01) |

(52) U.S. Cl.

CPC .......... *G07F 17/3211* (2013.01); *G07F 17/32* (2013.01); *G07F 17/3213* (2013.01); *G07F 17/3225* (2013.01); *G07F 17/3246* (2013.01); *G07F 17/34* (2013.01); *G07F 17/42* (2013.01)

(58) Field of Classification Search

USPC .......................... 463/16, 20, 25, 30, 31, 42

See application file for complete search history.

(56) References Cited

U.S. PATENT DOCUMENTS

| | | | |
|---|---|---|---|
| 5,111,391 | A | 5/1992 | Fields et al. |
| 5,127,651 | A | 7/1992 | Okada |

(Continued)

FOREIGN PATENT DOCUMENTS

| | | | |
|---|---|---|---|
| CN | 1910630 | A | 2/2007 |
| CN | 1914650 | A | 2/2007 |

(Continued)

OTHER PUBLICATIONS

Bally Command Center Brochure, Ballys Technologies 2009, 16 pages.

(Continued)

*Primary Examiner* — Adetokunbo O Torimiro
(74) *Attorney, Agent, or Firm* — Marger Johnson

(57) ABSTRACT

Embodiments of the present invention are directed to gaming devices that provide audio-visual animated characters in response to game play. The character has a personality that may be encouraging, taunting or another quality. A plurality of expressions of the personality is presented, between one extreme and another, dependant upon the history of game outcomes.

20 Claims, 10 Drawing Sheets

Related U.S. Application Data

(60) Provisional application No. 60/926,870, filed on Apr. 30, 2007.

(56) References Cited

U.S. PATENT DOCUMENTS

| | | | |
|---|---|---|---|
| 5,280,909 | A | 1/1994 | Tracy |
| 5,292,127 | A | 3/1994 | Kelly et al. |
| 5,342,049 | A | 8/1994 | Wichinsky et al. |
| 5,560,603 | A | 10/1996 | Seelig et al. |
| 5,743,523 | A | 4/1998 | Kelly et al. |
| 5,788,573 | A | 8/1998 | Baerlocher et al. |
| 5,816,918 | A | 10/1998 | Kelly et al. |
| 5,823,874 | A | 10/1998 | Adams |
| 5,823,875 | A | 10/1998 | Tarantino |
| 5,830,065 | A | 11/1998 | Sitrick |
| 5,848,932 | A | 12/1998 | Adams |
| 5,857,909 | A | 1/1999 | Rubin |
| 5,911,418 | A | 6/1999 | Adams |
| 5,941,773 | A | 8/1999 | Harlick |
| 5,970,143 | A | 10/1999 | Schneier et al. |
| 5,980,384 | A | 11/1999 | Barrie |
| 6,113,492 | A | 9/2000 | Walker et al. |
| 6,146,273 | A | 11/2000 | Olsen |
| 6,174,234 | B1 | 1/2001 | Siebert, Jr. et al. |
| 6,217,447 | B1 | 4/2001 | Lofink et al. |
| 6,224,482 | B1 | 5/2001 | Bennett |
| 6,227,970 | B1 | 5/2001 | Shimizu et al. |
| 6,231,445 | B1 | 5/2001 | Acres |
| 6,254,483 | B1 | 7/2001 | Acres |
| 6,319,122 | B1 | 11/2001 | Packes, Jr. et al. |
| 6,322,309 | B1 | 11/2001 | Thomas et al. |
| 6,358,146 | B1 | 3/2002 | Adams |
| 6,446,964 | B1 | 9/2002 | Kelly et al. |
| 6,454,651 | B1 | 9/2002 | Yoseloff |
| 6,491,296 | B2 | 10/2002 | Kelly et al. |
| 6,575,832 | B1 | 6/2003 | Manfredi et al. |
| 6,605,000 | B2 | 8/2003 | Adams |
| 6,645,068 | B1 | 11/2003 | Kelly et al. |
| 6,699,124 | B2 | 3/2004 | Suchocki |
| 6,728,679 | B1 | 4/2004 | Strubbe et al. |
| 6,769,986 | B2 | 8/2004 | Vancura |
| 6,800,027 | B2 | 10/2004 | Giobbi et al. |
| 6,827,646 | B2 | 12/2004 | Adams |
| 6,851,674 | B2 | 2/2005 | Pierce et al. |
| 6,932,702 | B1 | 8/2005 | Harris |
| RE38,812 | E | 10/2005 | Acres et al. |
| 6,984,173 | B1 | 1/2006 | Piechowiak et al. |
| 7,069,184 | B1 | 6/2006 | Barger et al. |
| 7,100,916 | B2 | 9/2006 | Kelly et al. |
| 7,105,736 | B2 | 9/2006 | Laakso |
| 7,144,321 | B2 | 12/2006 | Mayeroff |
| 7,278,635 | B2 | 10/2007 | Kelly et al. |
| 7,303,469 | B2 | 12/2007 | Kaminkow |
| 7,311,304 | B1 | 12/2007 | Kelly |
| 7,327,217 | B2 | 2/2008 | Carter et al. |
| 7,361,088 | B2 | 4/2008 | Maya et al. |
| 7,621,809 | B2 | 11/2009 | Baerlocher et al. |
| 7,729,946 | B2 | 6/2010 | Chu |
| 7,753,789 | B2 | 7/2010 | Walker et al. |
| 7,780,520 | B2 | 8/2010 | Baerlocher |
| 7,957,565 | B1 | 6/2011 | Sharma et al. |
| 8,023,965 | B2 | 9/2011 | Michaud |
| 2001/0024971 | A1 | 9/2001 | Brossard |
| 2002/0007276 | A1 | 1/2002 | Rosenblatt et al. |
| 2002/0046102 | A1 | 4/2002 | Dohring et al. |
| 2002/0132666 | A1 | 9/2002 | Lind et al. |
| 2002/0152120 | A1 | 10/2002 | Howington |
| 2002/0161882 | A1 | 10/2002 | Chatani |
| 2003/0003997 | A1 | 1/2003 | Vuong et al. |
| 2003/0013527 | A1 | 1/2003 | Rowe et al. |
| 2003/0054878 | A1 | 3/2003 | Benoy et al. |
| 2003/0069074 | A1 | 4/2003 | Jackson |
| 2003/0078101 | A1 | 4/2003 | Schneider et al. |
| 2003/0114217 | A1 | 6/2003 | Walker et al. |
| 2003/0195031 | A1 | 10/2003 | O'Donovan et al. |
| 2003/0220139 | A1 | 11/2003 | Peterson |
| 2004/0002372 | A1 | 1/2004 | Rodgers et al. |
| 2004/0018478 | A1 | 1/2004 | Styles |
| 2004/0053660 | A1 | 3/2004 | Webb et al. |
| 2004/0072608 | A1 | 4/2004 | Toyoda |
| 2004/0127290 | A1 | 7/2004 | Walker et al. |
| 2004/0147300 | A1 | 7/2004 | Seelig et al. |
| 2005/0026678 | A1 | 2/2005 | Kaminkow |
| 2005/0119052 | A1 | 6/2005 | Russell et al. |
| 2005/0125244 | A1 | 6/2005 | Schneider |
| 2005/0148383 | A1 | 7/2005 | Mayeroff |
| 2005/0159211 | A1 | 7/2005 | Englman |
| 2005/0164764 | A1 | 7/2005 | Ghaly |
| 2005/0181860 | A1 | 8/2005 | Nguyen et al. |
| 2005/0181873 | A1 | 8/2005 | Bond |
| 2005/0239531 | A1 | 10/2005 | Osawa |
| 2006/0003825 | A1 | 1/2006 | Iwasaki et al. |
| 2006/0003826 | A1 | 1/2006 | Walker et al. |
| 2006/0003835 | A1 | 1/2006 | Olive |
| 2006/0025201 | A1 | 2/2006 | Van Asdale |
| 2006/0035705 | A1 | 2/2006 | Jordan et al. |
| 2006/0040723 | A1 | 2/2006 | Baerlocher et al. |
| 2006/0040735 | A1 | 2/2006 | Baerlocher |
| 2006/0053035 | A1 | 3/2006 | Eisenberg |
| 2006/0073877 | A1 | 4/2006 | Rodgers et al. |
| 2006/0073881 | A1 | 4/2006 | Pryzby et al. |
| 2006/0084496 | A1 | 4/2006 | Jaffe et al. |
| 2006/0128463 | A1 | 6/2006 | Okada |
| 2006/0154720 | A1 | 7/2006 | Okuniewicz |
| 2006/0160620 | A1 | 7/2006 | Matthews et al. |
| 2006/0172792 | A1 | 8/2006 | Vancura |
| 2006/0217176 | A1 | 9/2006 | Walker et al. |
| 2006/0223613 | A1 | 10/2006 | Walker et al. |
| 2006/0252528 | A1 | 11/2006 | Walker et al. |
| 2007/0054727 | A1 | 3/2007 | Garamendi et al. |
| 2007/0054733 | A1 | 3/2007 | Baerlocher |
| 2007/0054738 | A1 | 3/2007 | Muir |
| 2007/0087797 | A1 | 4/2007 | Van Luchene |
| 2007/0087834 | A1 | 4/2007 | Moser et al. |
| 2007/0111776 | A1 | 5/2007 | Griswold et al. |
| 2007/0117608 | A1 | 5/2007 | Roper et al. |
| 2007/0135202 | A1 | 6/2007 | Linard et al. |
| 2007/0174809 | A1 | 7/2007 | Brown et al. |
| 2007/0178909 | A1 | 8/2007 | Doyle |
| 2007/0180389 | A1 | 8/2007 | Holm et al. |
| 2007/0218982 | A1 | 9/2007 | Baerlocher |
| 2007/0225076 | A1 | 9/2007 | Aida |
| 2008/0004996 | A1 | 1/2008 | Keuhling |
| 2008/0020788 | A1 | 1/2008 | Griswold et al. |
| 2008/0020845 | A1 | 1/2008 | Low et al. |
| 2008/0139274 | A1 | 1/2008 | Baerlocher |
| 2008/0045288 | A1 | 2/2008 | Moshal et al. |
| 2008/0076529 | A1 | 3/2008 | Richards et al. |
| 2008/0086325 | A1 | 4/2008 | James |
| 2008/0090645 | A1 | 4/2008 | Walker et al. |
| 2008/0090651 | A1 | 4/2008 | Baerlocher |
| 2008/0125211 | A1 | 5/2008 | Plowman |
| 2008/0183678 | A1 | 7/2008 | Weston et al. |
| 2008/0207313 | A1 | 8/2008 | Acres |
| 2008/0280684 | A1 | 11/2008 | McBride et al. |
| 2008/0311979 | A1 | 12/2008 | Walker et al. |
| 2009/0048012 | A1 | 2/2009 | Patel et al. |
| 2009/0170608 | A1 | 7/2009 | Herrmann et al. |
| 2009/0234712 | A1 | 9/2009 | Kolawa et al. |
| 2009/0239667 | A1 | 9/2009 | Rowe et al. |
| 2009/0270168 | A1 | 10/2009 | Englman et al. |
| 2009/0284348 | A1 | 11/2009 | Pfeffer |
| 2009/0291762 | A1 | 11/2009 | Walker |
| 2010/0029382 | A1 | 2/2010 | Cao |
| 2010/0093434 | A1 | 4/2010 | Rivas |
| 2010/0121808 | A1 | 5/2010 | Kuhn |
| 2010/0125789 | A1 | 5/2010 | Burke et al. |
| 2010/0188936 | A1 | 7/2010 | Beppu et al. |
| 2010/0203968 | A1 | 8/2010 | Gill et al. |
| 2010/0234089 | A1 | 9/2010 | Saffari et al. |
| 2010/0298040 | A1 | 11/2010 | Joshi et al. |
| 2010/0323785 | A1 | 12/2010 | Motyl et al. |
| 2011/0071880 | A1 | 3/2011 | Spector |
| 2011/0183732 | A1 | 6/2011 | Block et al. |

(56) References Cited

U.S. PATENT DOCUMENTS

| | | | |
|---|---|---|---|
| 2011/0205068 | A1 | 8/2011 | Huynh et al. |
| 2011/0289064 | A1 | 11/2011 | Lebeau et al. |
| 2012/0094756 | A1 | 4/2012 | Griswold et al. |
| 2012/0150578 | A1 | 6/2012 | Mangat et al. |
| 2015/0339039 | A1 | 11/2015 | Amone et al. |
| 2016/0335840 | A1 | 11/2016 | Acres |

FOREIGN PATENT DOCUMENTS

| | | | |
|---|---|---|---|
| EP | 0443738 | A2 | 8/1991 |
| EP | 0896305 | A2 | 10/1998 |
| EP | 1076321 | A1 | 2/2001 |
| GB | 2354179 | A | 3/2001 |
| GB | 2408949 | A | 6/2005 |
| JP | 4024039 | A | 1/1992 |
| JP | 6343738 | A | 12/1994 |
| WO | 02/32517 | A2 | 4/2002 |
| WO | 2005000629 | | 1/2005 |
| WO | 2005073933 | | 8/2005 |
| WO | 2008/130398 | A1 | 10/2008 |

OTHER PUBLICATIONS

Bally Technologies, "RCT Online, Daily News, Bally Technologies provides Foxwoods with new slots," 2011, 1 page.

Casino City Press, "Chops & Assoc. Live Animation," Nov. 11, 2011, 1 page.

Chops & Assoc. Live Animation, CasinoVendors/com, http://www.casinovendors.com/vendor/shops-assoc-live-animation, downloaded Nov. 11, 2011, 1 page.

CHS Backoffice UI Design, cargocollective webpages, Mar. 2012, 9 pages. http://cargocollective.com/yaavs#CHS-BackOffice.

CHS Backoffice UI Design part 2, cargocollective webpages, Mar. 2012, 10 pages. http://yanavs.com/79633/7428672/-portfolio/-chs-boffice.

Factiva, Inc., "Nortel Networks Ltd—Solutions Enhance Competitive Edge of Hospitality Sector in Caribbean and Latin America," May 17, 2006, 3 pages.

Factiva, Inc., "Resort and Casino Companies: Great Wolf Lodge—Pocono Mountains Unveils 'Great Wolfe Story Explorers'", 2011, 2 pages.

Garnett, O., "An Introduction to skills-based routing and its operational complexities", Service Engineering 2000, 28 pages.

Montana, "Genetic Algorithms for Complex, Real-Time Scheduling", International Conference on Systems, Man and Cybernetics, 1998, 8 pages. http://citeseerx.ist.psu.edu/viewdoc/summary?doi=10.1.1.130.3277.

Reateguia, E. et al. Personalization in an Interactive Environment through a Virtual Character, Computers & Education, vol. 51, Issue 2, Sep. 2008, abstract, 1 page.

Sciencedirect.com, "Personalization in an interactive learning environment through a virtual character," abstract, 2007, 1 page.

SDS line testing with the 19C Scopemeter test tool, fluke webpages, Feb. 2012, 5 pages. http://support.fluke.com/find-sales/download/asset/2444901_a_w.pdf.

Xue et al, "A fuzzy mathematics based optimal delivery scheduling approach", Computers in Industry 45, 245-259 2001.

GAMING DEVICE WITH PERSONALITY

CROSS-REFERENCE TO RELATED APPLICATIONS

This application is a continuation of U.S. Non-Provisional application Ser. No. 15/225,431 filed Aug. 1, 2016, which is continuation of U.S. Non-Provisional application Ser. No. 14/158,518 filed Jan. 17, 2014, now U.S. Pat. No. 9,430,898 issued Aug. 30, 2016, which is a continuation of U.S. Non-Provisional application Ser. No. 12/111,462 filed Apr. 29, 2008, now U.S. Pat. No. 8,632,400 issued on Jan. 21, 2014, which claims the benefit of U.S. Provisional Patent Application No. 60/926,870 filed Apr. 30, 2007, whose contents are incorporated by reference for all purposes.

FIELD OF THE INVENTION

This disclosure relates generally to gaming devices and more particularly to gaming devices that provide an indication of player performance beyond displaying the outcome of each game.

BACKGROUND

Gaming devices typically includes a plurality of possible outcomes, some of which are winning outcomes and some of which are losing outcomes. Each game usually displays a pay table that indicates whether each outcome is a winning outcome or a losing outcome. As a result, a player can determine whether the outcome of each game he or she plays is a winning or losing outcome by comparing it to the pay table. Of course the game itself responds to each game played by paying for each win, e.g., via the credit meter, hand pay, player account, etc., or by not paying thus indicating a loss.

Some gaming devices further emphasize a single winning outcome with a variety of sound, light, or audio-visual effects. This is in contrast to losses, which are not emphasized or typically even acknowledged other than by not indicating a win.

DETAILED DESCRIPTION

Figure 1A:
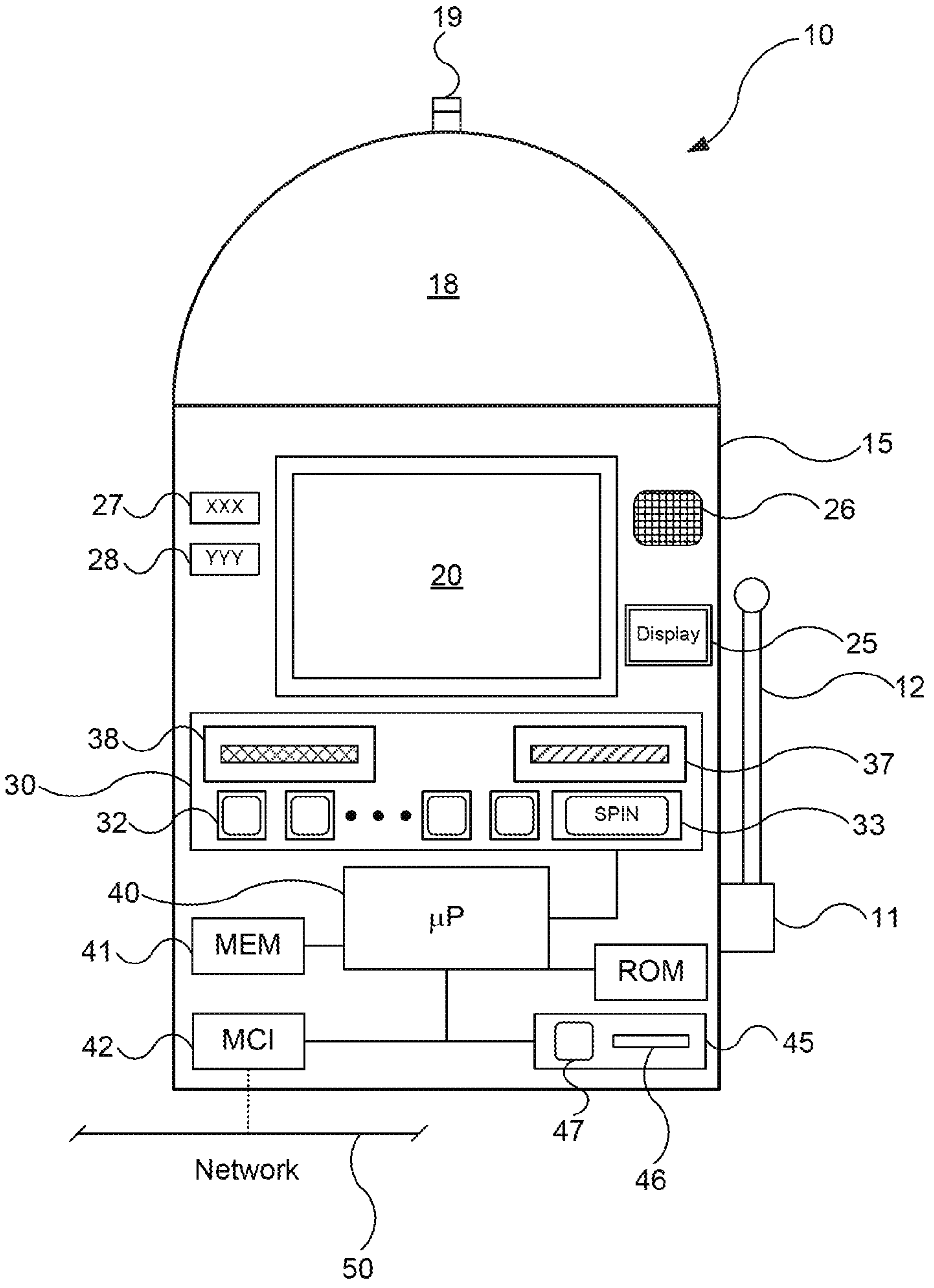
FIG. 1A is a functional block diagram that illustrates a gaming device according to embodiments of the invention.
Figure 1B:
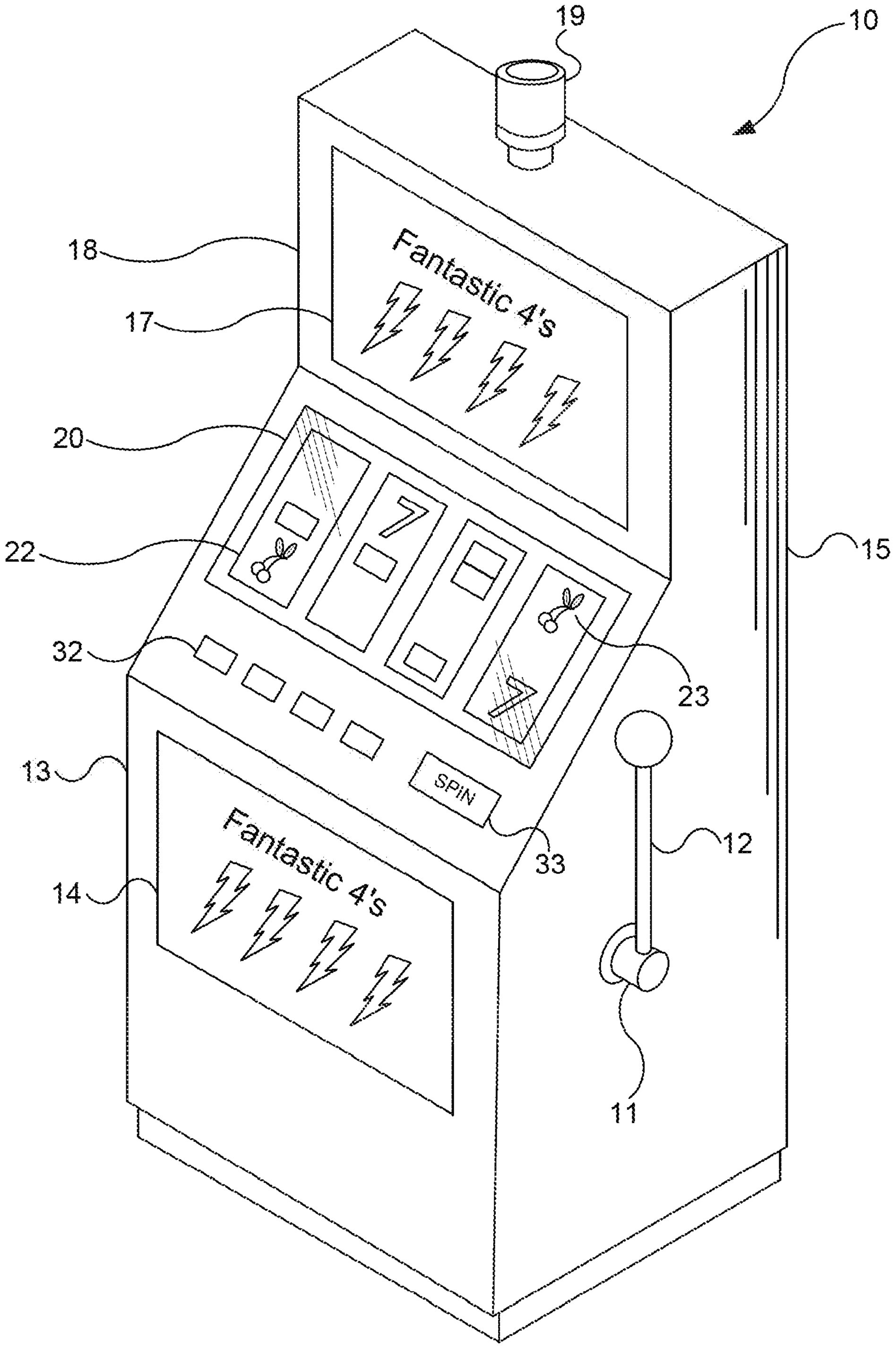
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include table games, computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game.

The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show ancillary information to the player. For example, the secondary display 25 may show player tracking information, secondary bonus information, advertisements, or player selectable game options.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in a memory 43, which may be a ROM, as firmware, controlling the display 20 to represent the outcome of a game, communicate with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit card into a card reader/authorizer (not shown). The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
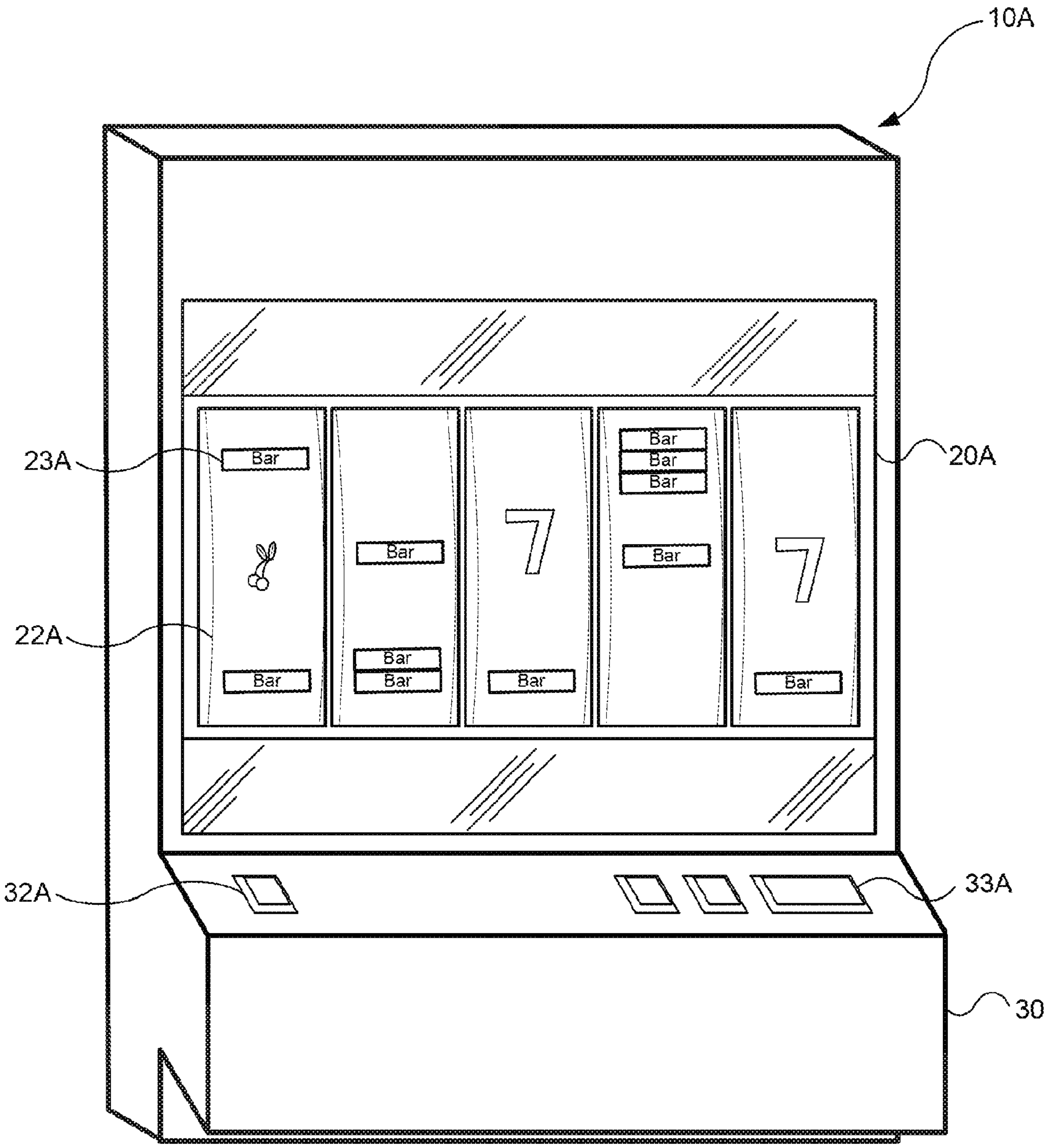
FIGS. 2A, 2B, and 2C are detail diagrams of exemplary types of gaming devices according to embodiments of the invention.
Figure 2B:
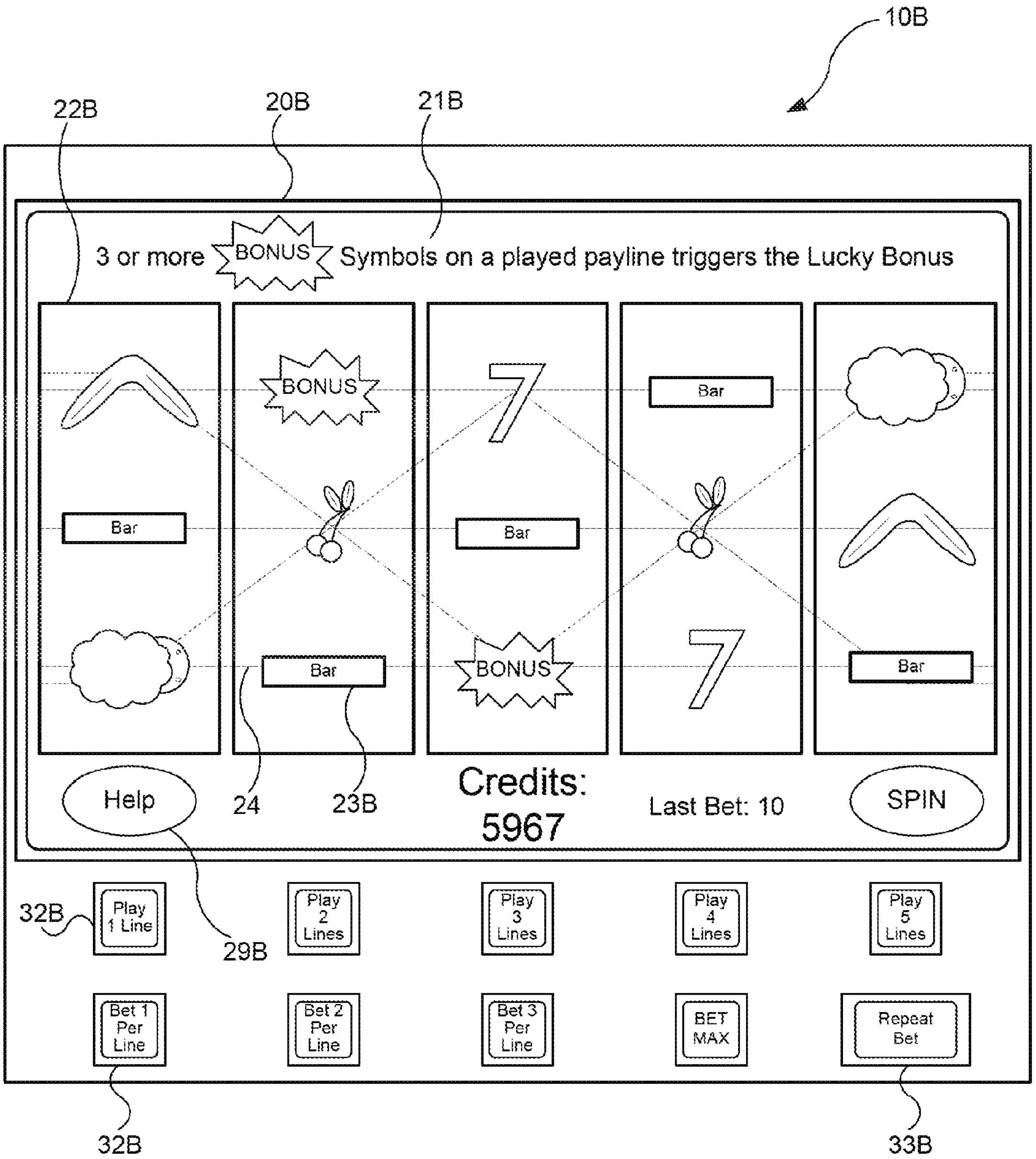
Figure 2C:
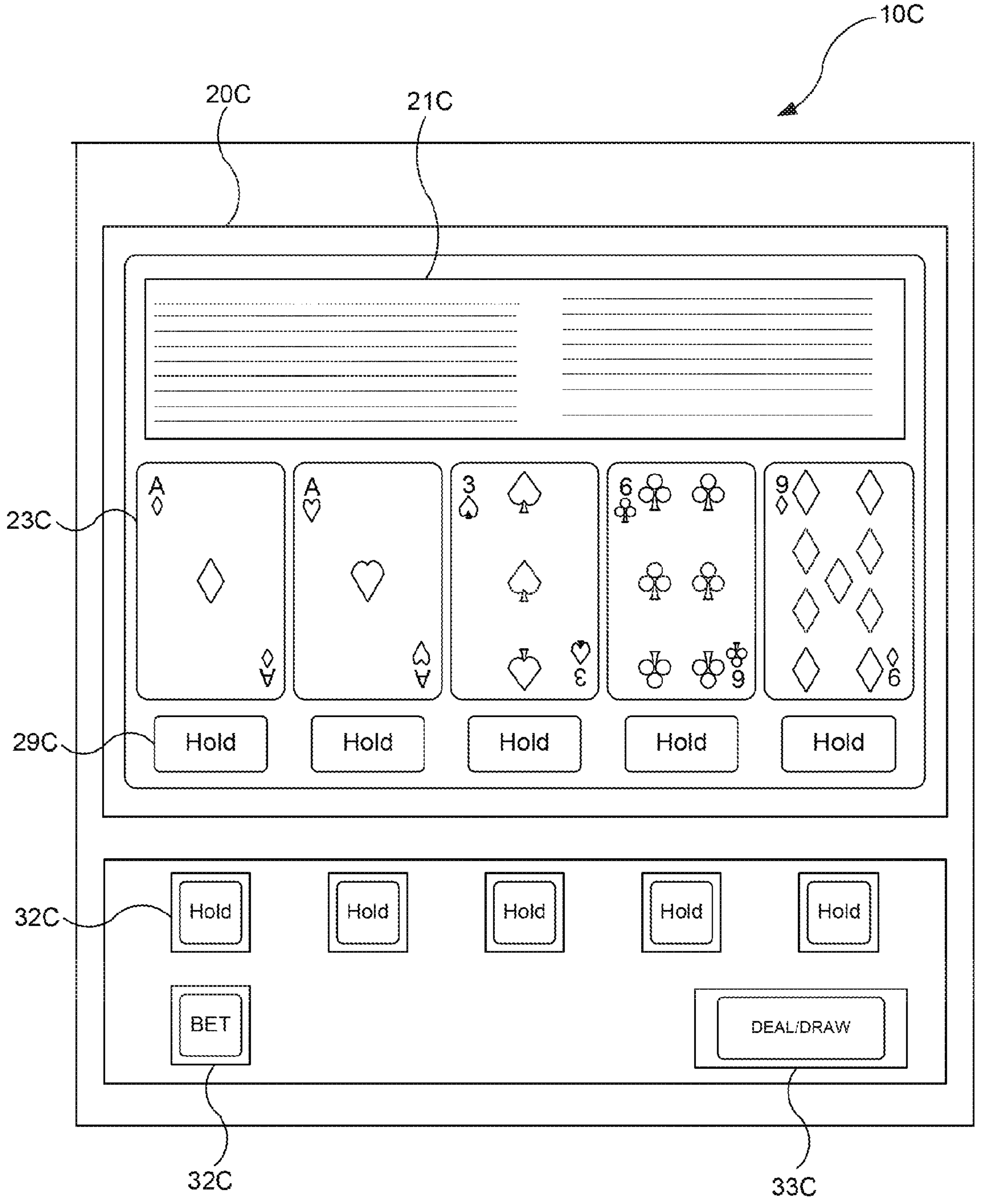

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty-two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23B appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, “soft buttons” 29B such as a “spin” button or “help/see pays” button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play “draw” poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is “held” before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines various other types of gaming devices known in the art are contemplated and are within the scope of the invention.

Figure 3:
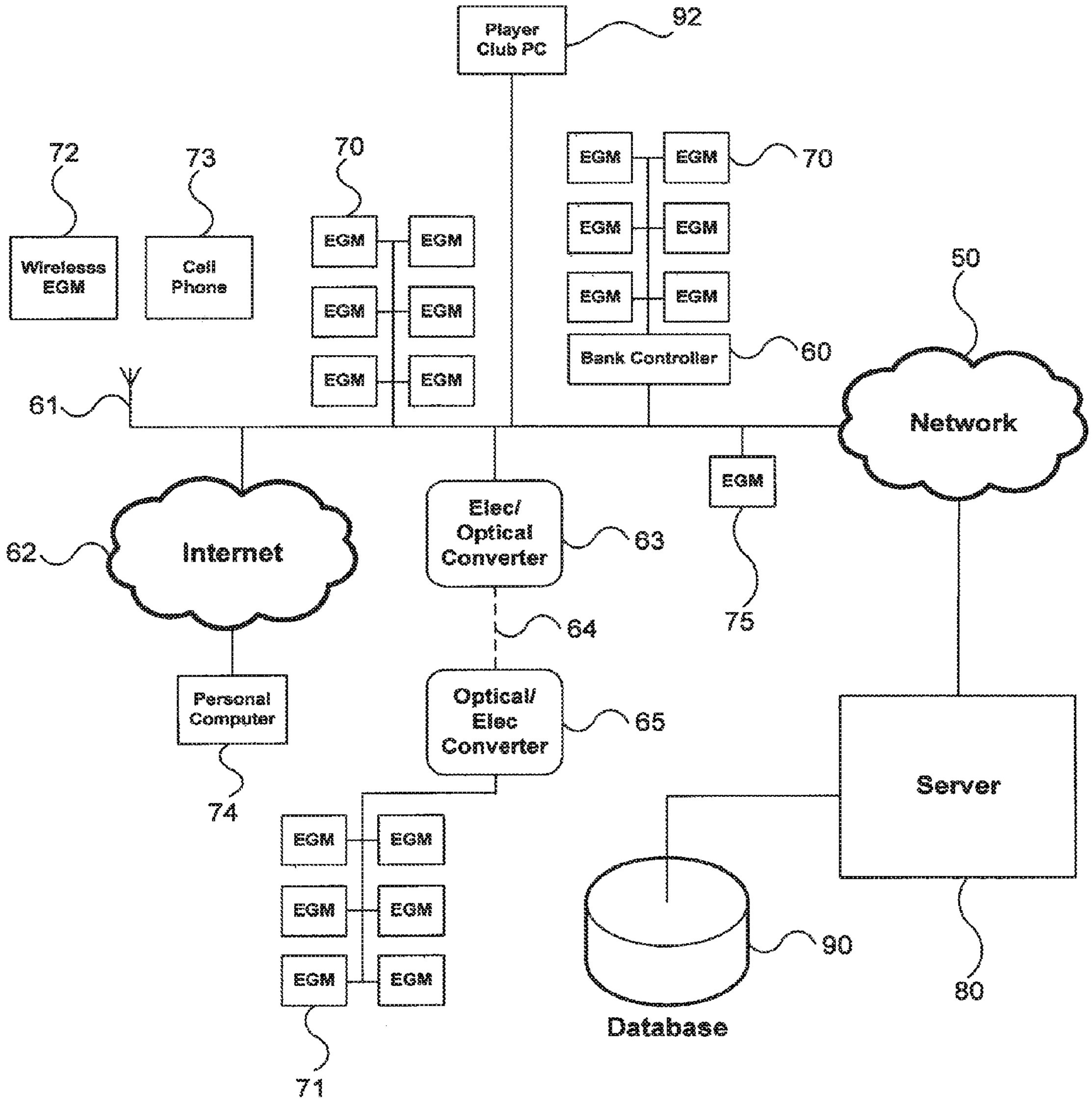
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, firewire lines, USB lines, or other communication protocols. Although not shown in FIG. 3, substantially the entire network 50 may be made of optical lines 64 or may be a wireless network.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records on in the player database 90 to provide the player with information regarding their player accounts or other features at the gaming device 10 where the player is wagering. Additionally, multiple databases 90 and/or servers 80 may be present and coupled to one or more networks 50 to provide a variety of gaming services, such as both game/tournament data and player tracking data.

A player's club personal computer 92 is also connected to the network. It is typically located at a player's club desk where players may register for the player tracking program, redeem points, and conduct other business related to the player's club program. Kiosks (not shown) located on the playing floor may also include computers connected to the network for use by players. The player may check accrued points and transact other player's club business to the extent provided by the kiosk computer.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
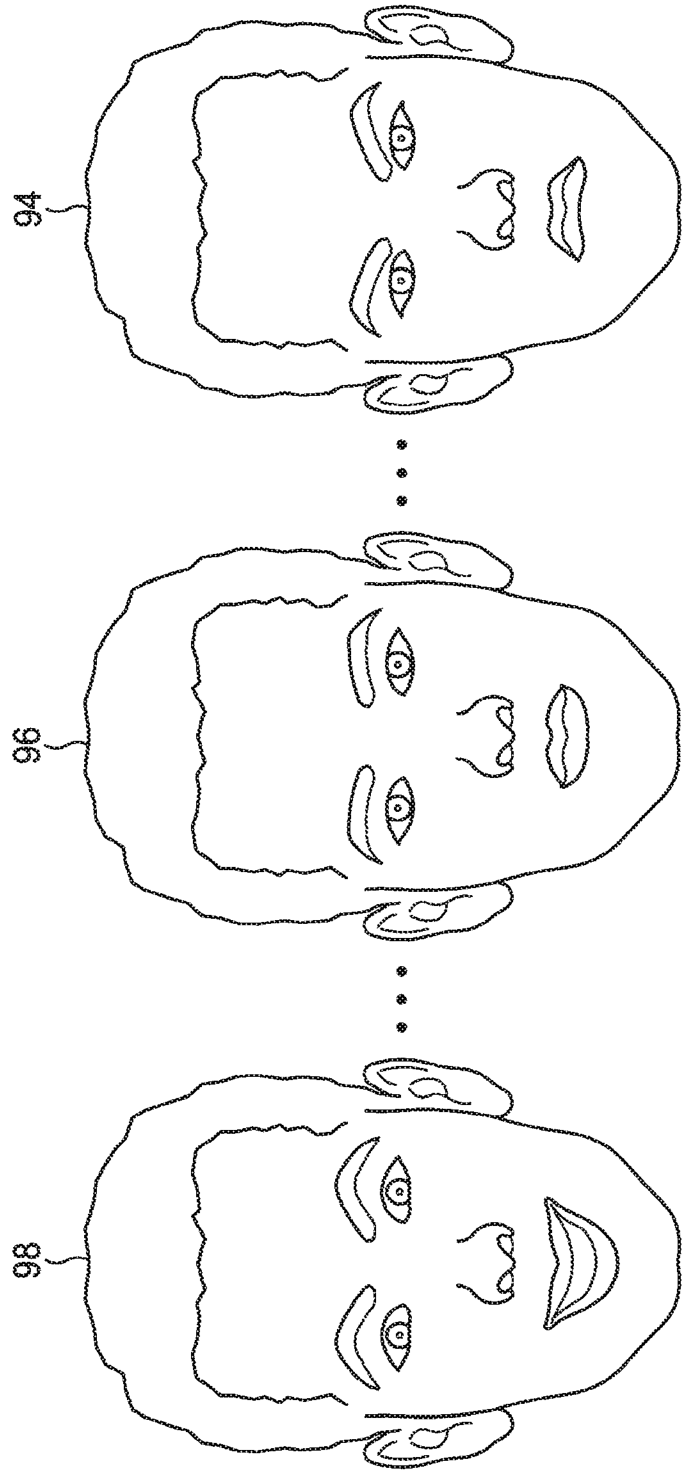
FIG. 4 is a schematic view of a plurality of different expressions of an animated character associated with a game personality.

Turning now to FIG. 4, included therein are a plurality of different expressions of an animated character. A first expression 94 is of a character that expresses an extreme of a taunting or discouraging personality. A second expression 96 is of the same character with a fairly neutral expression. And a third expression 98 is of the same character expressing an extreme of a supportive or encouraging personality. The ellipses between the expressions indicate that there may be a plurality of gradually changing expressions from the first expression 94 to expression 96, each growing progressively less discouraging. Similarly, a plurality of additional expressions between expression 96 and 98 gradually change with each being progressively more encouraging. As will be described in more detail, this animated character appears on display 20, or a portion thereof, and is accompanied by sound from speaker 26 to present a coordinated audio-visual display of the character speaking to a player of the gaming device.

Next, a description will be made of how a version of the game appears to the player as it is played. Thereafter, a more detailed description of how the game is implemented will be provided. In one approach, the game is configured to provide a discouraging or taunting personality based on the history of game outcomes for a player. In other words, if the player is more or less on a losing streak, the player taunts the player more aggressively. The character may appear or be animated before, during, or after each play. For example, the character might say: "Is that the best you can do, loser?" For a gaming device with this personality, even a winning history may produce a negative response, by talking down a win. Games with this personality would be animated with a character having expressions ranging between expression 94 and expression 96 in FIG. 4.

Another implementation could include a game with a friendly or encouraging character that is animated with expression ranging between expression 96 and expression 98. With this personality, even a losing streak could produce encouragement from the character, such as: "Keep trying. You'll win soon."

Still another implementation might incorporate the entire range of expressions between expression 94 and expression 98. The winning history could be associated with the friendly/encouraging character between expressions 96, 98, and the losing history could be associated with the more negative, discouraging character between expressions 94, 96, or vice versa.

Figure 5:
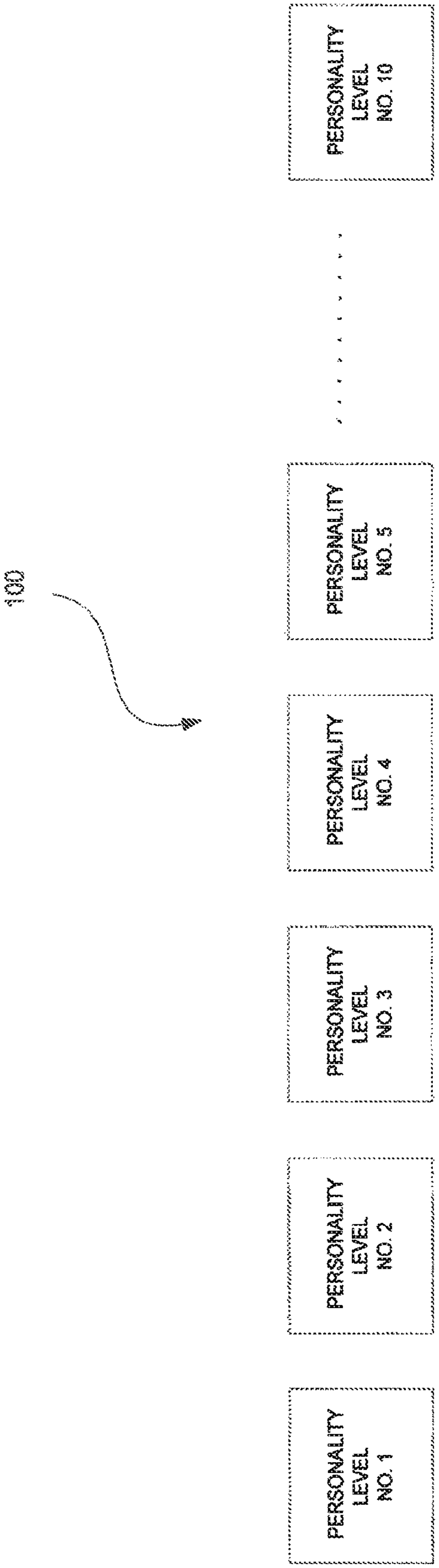
FIG. 5 is a schematic view of stored game personality levels.

Consideration will be given now to a more detailed description of how the present embodiments are implemented and on variations thereof. Turning to FIG. 5, indicated generally at 100 are a plurality of different game personality levels that may be stored in ROM 43, or a different game memory, in FIG. 1A. Alternatively, these may be stored in a memory, such as database 90, located anywhere on the network in FIG. 3.

A different one of the animated expressions, such as animated expression 94, is associated with each personality level in FIG. 5. Like the personality levels, the animated expressions may be stored in the game, for example in ROM 43 or a different game memory, or anywhere on the network. Each game may have associated stored personality levels with its own personality, depending upon the animated expressions associated with the game's personality levels.

Figure 6:
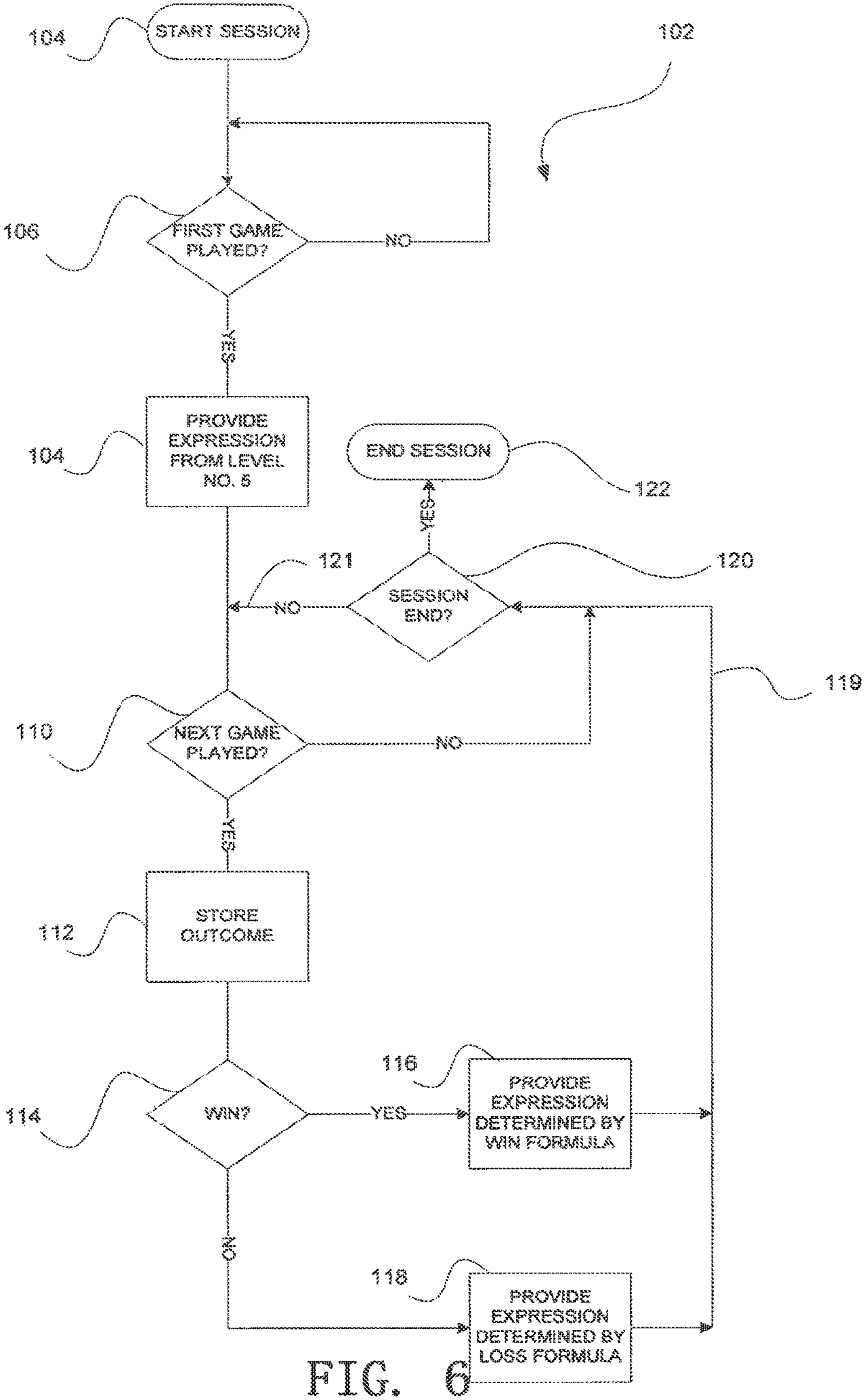
FIG. 6 is a flow chart depicting operation of an embodiment of the present invention.

Turning now to FIG. 6, indicted generally at 102 is a process that controls the operation of an embodiment of the invention. In box 104 the process may be initiated when a player inserts his or her player tracking card into card reader 46 or otherwise identifies him or herself to the network. Alternatively, in the case where a player plays without a card and is therefore unidentified, the process is initiated in box 106 when the player plays the first game. In either case, the system waits for the first game and when it is played proceeds to box 108 where personality level no. 5 is selected and the animated audio-visual sequence associated with the selected level is provided to the player via display 20 and speaker 26. Of course other displays and speakers could be used to provide the selected sequence. Audio files could be stored either at the game or on the network and could comprise WAV, MP3, or other formats depending upon available storage space and the desired quality of the sound. Video displays may be flash based, bit-map encoded, or according to another custom or standardized format.

Assuming in the present embodiment that character expression 94 is associated with personality level no. 1, character expression 96 is associated with level no. 5 and character expression 98 is associated with level no. 10. Levels 2-4 are associated with expressions that progress gradually in sequence between expressions 94, 96, and levels 6-10 are associated with expressions that progress gradually in sequence between expressions 96, 98.

In box 108, the audio-visual animation sequence associated with level 5 is run presenting a relatively neutral expression and associated remarks to the player. In box 110 the process checks to see if the next game is played, and when it is, the outcome is stored in box 112. It should be appreciated that current systems store game outcomes and that the present embodiment may be implemented using those stored outcomes.

In box 114, the process checks to see if the game outcome was a win. If so, one or more win formulas are applied in box 116. The win formulas determine whether there will be a change in the character's expression as a result of the most recent play. The determination, however, is not necessarily based solely on the result of the last play. Rather the stored outcome history may be used to determine if an expression other than that associated with level 5 will next be presented. For example, one formula might simply check to see if the outcome was any outcome associated with a win on the game's pay table. If so, the personality level is advanced by 1. As a result, audio-visual animation associated with level no. 6 is provided.

Another win formula might require a more substantial win than just any win in the pay table to change the character's expression. For example, only winning outcomes greater than twice the wager will produce a change in the expression. Still other formulas might consider the number of wins over the last X number of games or the number of credits won in the preceding X minutes. The change in expression need not be only in step-by-step sequence of the personality levels. For jackpots above, e.g, 100 credits, the selected expression might jump by, e.g., 2 levels. For a jackpot over a predefined large amount, e.g., 1000 credits, the expression associated with level 10, the most encouraging expression, might be selected regardless of the level of the most recently provided expression.

Returning again to box 114, if the outcome was a losing outcome, one or more loss formulas are applied in box 118. One such formula might be reducing the currently personality level by 1 if the outcome is any outcome recognized as a loss by the game pay table. As a result, the audio-visual expression associated with level no. 4 would be provided. Another formula might be a predefined number of losses in a row, which results in a selection of an expression associated with a personality level that is lower by one or more levels.

It can be appreciated that numerous win and loss formulas involving size of win, history of outcomes, time periods, etc., could be formulated to determine change in gaming device personality. In addition, a single formula or multiple formulas can be applied for both the losses and wins. Applying the loss formula(s) is referred to herein as determining which outcomes are within a first group of losing outcomes and applying the win formula(s) is referred to herein as determining which outcomes are within a second group of outcomes. The groups are also referred to herein as categories.

In FIG. 6, after the win or loss formulas are applied, the process checks, via line 119, to see if the playing session has ended in box 120. This may occur as a result of a player removing his or her player tracking card from card reader 46, or otherwise logging out of the system. When that occurs the session ends in box 122. If the player has not logged out, control is again transferred, via line 121, to box 110.

Figure 7:
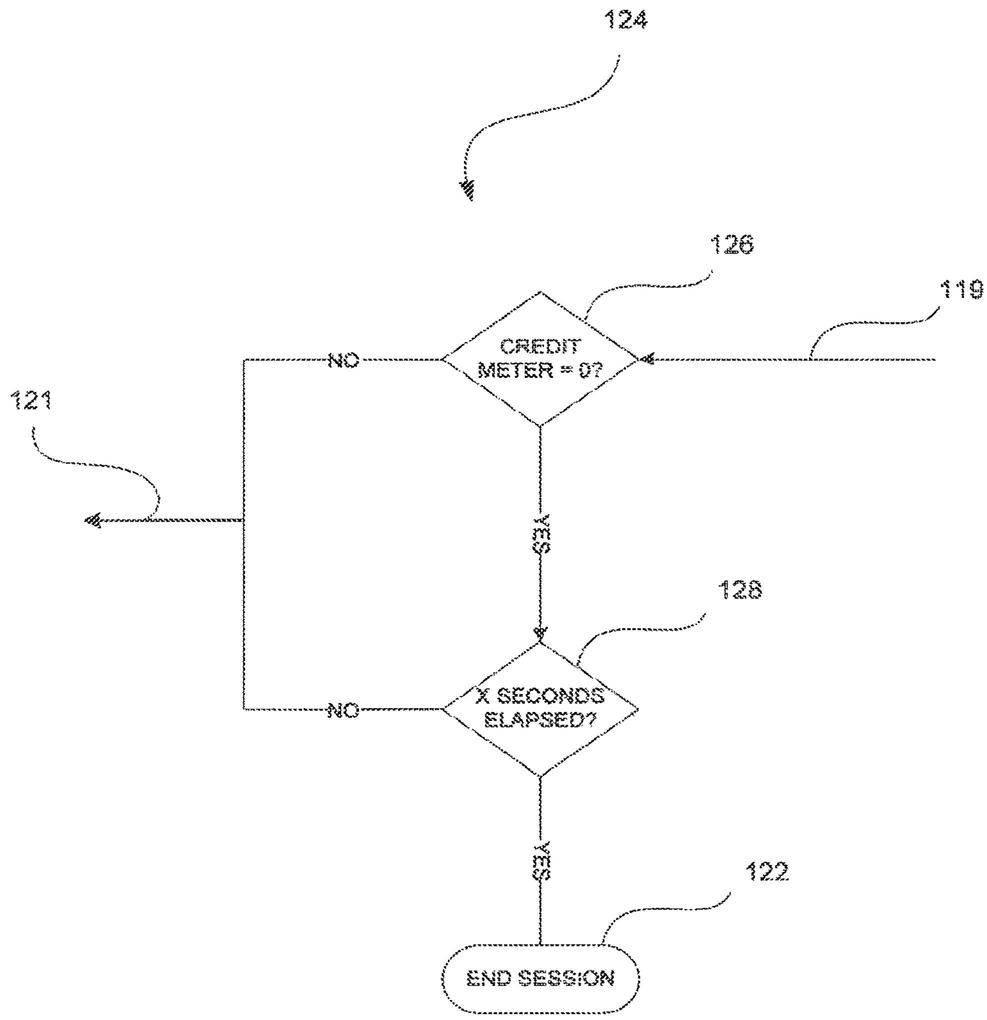
FIG. 7 is a flow chart depicting a portion of another embodiment.

Alternatively, if the player is unidentified, i.e., not logged into the system via a card or otherwise, a sub-process, indicated generally at 124 in FIG. 7, runs to determine whether the session should end. In box 126 the credit meter is checked to see if any credits remain. If credits remain on the meter, control is again transferred to box 110 via line 121. If no credits remain, box 128 checks to see if a predetermined amount of time has passed since the last game play. If so, the session is ended at box 122. This system is more fully described in copending U.S. application Ser. No. 12/061,516 filed Apr. 2, 2008, for Attributing Game Play Credit to a Player, which is incorporated herein by reference for all purposes. The processes illustrated in FIGS. 6 and 7 may be implemented by microprocessor 40 using code that defines the processes. The code may be stored in memory in the gaming device or on the network. At least part of this process is referred to herein as a controller.

In an alternate embodiment, the current personality level could be reset to personality level 5 if the game has gone unplayed for a predetermined time. In a still further variation, personality level selection could continue under control of the process of FIG. 6 even as players change. In other words, the personality level never or seldom resets.

There are a number of variations and refinements that can be implemented according to the invention. For example, there could be a plurality of similar expressions stored at each personality level. This would prevent the machine personality from becoming repetitive and possibly annoying when the personality level does not change for several plays. Each expression at single level has a generally similar emotional quality, but could be saying or doing different things.

Different machines in a casino could have different personalities. Some could have the encouraging or discouraging personalities described above. Others might have a nagging or sexually suggestive personality with the latter being more alluring during winning sequences and more rejecting when the player is losing. Rather than casino assigned personalities, a player could select a personality using the player tracking system. For example, the player could request a personality at the player's club, which could use the player club PC 92, in FIG. 3, or a kiosk (not shown), to associate a personality with the player's account. Alternatively, the request could be made by the player at the gaming device using gaming device, player tracking, or other controls. Each time the player uses card reader 46 or otherwise identifies him or herself to the system, the personality is provided to the player via that game. The personality levels and associated expressions may be stored on the network or locally at the gaming device.

In a further aspect, the general personality remains the same as the player moves from machine to machine but varies somewhat based on the type of machine the player is playing. For example, assume the player selected an encouraging personality. When the player logs into the player tracking system at a video poker machine, the personality is encouraging but with an accent, e.g., a southern accent. When logged into a slot machine, the personality remains encouraging but has a powerful voice or a soft voice. Another machine might still be encouraging but use slang. The variations are endless.

Rather than animated fantasy or human characters, videos or animations of celebrities might be used. For example, a celebrity appearing at the casino might be used only for the duration of their appearance there. In addition, players might be required to qualify to receive a personality or a particular personality. Such qualification could be by winning or accruing player tracking points. Or the player might be required to purchase a personality, especially one that is considered to be more desirable.

Although the present examples focus on audio-visual animations or videos, any kind of sensory indication to the player could be use. For example, pleasing or annoying sounds could be used with or without variations in volume. The pleasing sounds could be musical or otherwise. All audio, whether voices or sounds could be recorded or synthesized. The visual presentation may be as simple as text, which could appear either on screen 20, secondary display 25, or on another display (not shown). Any combination of audio, visual, tactile, smell or other sensory indication may be used to provide a gaming device personality. The sensory indication is provided via an indicator that may comprise a display, a speaker, and any related controls required for implementation.

Concerning player selection of personality as described above, in one embodiment, the player could choose levels of irritability, candor, or kindness (or lack thereof). These categories are offered for illustration and are not meant to limit the categories offered to any player. In addition, each player may choose the method of information delivery, including audio, visual or other sensory messages. Audio may, among other possibilities, include voice selection, volume, tone and accent. Audio may be presented using standard audio broadcast devices included on the gaming machine or may be presented through additional equipment, including headsets. Visual may include, but is not limited to, display of images, written messages, animations and colors. Visual information may be displayed through the game's video screen, through the player tracking display or through other means. In addition to associating exhibitions of personality with game outcomes, machine personality could also be expressed in response to any other machine event. For example, when an unidentified player (one not logged into the system via a card or otherwise) inserts money, the character might say: "The last guy did pretty well here. I doubt you can beat him" In addition, an unidentified player might hear: "What's the matter; too scared to join our club?"

An indentified player, on the other hand, upon inserting money could hear a message that corresponds to his or here recent play, such as: "You again, loser?" Or he or she might here a message concerning a casino event: "Hey, you missed the slot tournament last week. I missed you."

Further messages could be provided when additional money is inserted. These could depend on how much was lost and/or how much inserted. The player could also receive a message when cashing out, with the message depending upon how the player fared and/or how much was cashed out. A message might even be generated when an error condition in a game occurs. There are limitless possibilities.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method for operating a network of gaming devices comprising:

receiving currency at each of the gaming devices via a physical item acceptor, the currency having a monetary value;

receiving a wager from the currency in response to actuation of an input device at each of the gaming devices;

initiating play of a game at a plurality of the gaming devices in response to actuation of an input device at each of the gaming devices;

tracking outcomes of at least some plays of at least some of the gaming devices;

generating a first presentation of a character speaking at least one short phrase who in at least one of appearance and tone of voice exhibits a first personality associated with one of the outcomes;

presenting the generated presentation to a player of one of the gaming devices so that the character appears to be speaking to the player;

changing the personality responsive to a change in at least one of the outcomes;

generating a second presentation of the character speaking at least one short phrase who in at least one of appearance and tone of voice exhibits a second personality different from the first personality, the second personality being associated with a different one of the outcomes; and presenting the generated presentation of the character exhibiting the second personality to the player so that the character appears to be speaking to the player.

2. The method of claim 1 wherein the first and second personalities are selected from a range of personalities, the method further comprising storing a plurality of different character personalities ranging from one indicating a history of generally losing outcomes to another indicating a history of generally winning outcomes.

3. The method of claim 1 wherein the audio-visual presentations comprise a voice having a character selected from a group comprising a supportive voice, a taunting voice, a nagging voice, and a suggestive voice.

4. The method of claim 3 wherein the second personality comprises a difference from the first personality in at least one of a tone and volume of the voice.

5. The method of claim 1 wherein the presentations comprise at least one of displayed text and displayed animation.

6. The method of claim 1 further comprising allowing a player of one of the gaming devices to select at least one of the personalities.

7. The method of claim 2 further comprising:

associating a character expression with each of at least some of the personalities; and displaying one of the associated character expressions.

8. The method of claim 7 further comprising selecting a personality adjacent to the personality associated with the displayed one of the associated character expressions responsive to a further change in at least one of the outcomes and displaying the character expression associated with the adjacent personality.

9. The method of claim 8 further comprising:

initiating a playing session on one of the gaming devices; and associating the occurrence of the first game personality in the playing session with a personality about midway in the range.

10. The method of claim 1 further comprising displaying a character that incorporates an expression associated with the personality.

11. The method of claim 1 wherein plays of the gaming device are made by a player and wherein the method further comprises resetting the game personality to a predefined personality responsive to an indication that the player has stopped playing the gaming device.

12. The method of claim 1 further comprising changing the game personality of the second presentation responsive to a change in at least one of the outcomes.

13. The method of claim 1 wherein the method further comprises:

associating one of the personalities with the player; and displaying the associated personality on different ones of the gaming devices played by the player.

14. A method for operating a network of gaming devices comprising:

receiving currency at each of the gaming devices via a physical item acceptor, the currency having a monetary value;

receiving wagers from the currency in response to repeated actuation of an input device at each of the gaming devices;

initiating play of a game at a plurality of the gaming devices in response to each actuation of an input device at each of the gaming devices;

tracking outcomes of at least some of the plays of the gaming devices;

generating a plurality of different presentations of characters speaking at least one short phrase who in at least one of appearance and tone of voice exhibits a personality that is a function of a game outcome; and presenting one of the generated presentations to each player of one of the gaming devices so that the character appears to be speaking to the player in response to the game outcome.

15. The method of claim 14 wherein the presentations each comprises a voice having a character selected from a group comprising a supportive voice, a taunting voice, a nagging voice, and a suggestive voice.

16. The method of claim 15 wherein one of the presentations has a voice tone or volume that is different from the voice tone or volume of another of the audio-visual presentation.

17. The method of claim 14 wherein at least one of the presentations comprise at least one of displayed text and displayed animation.

18. The method of claim 14 further comprising allowing a player of one of the gaming devices to select at least one of the presentations.

19. The method of claim 14 wherein a first and a second audio-visual presentations are selected from a plurality of audio-visual presentations, the method further comprising:

storing a plurality of different character personalities ranging from one level indicating a history of generally losing outcomes to another level indicating a history of generally winning outcomes; and wherein presenting one of the presentations comprises displaying a selected one of the character personalities.

20. A method for operating an electronic gaming machine of the type that generates a random outcome in response to an input from a player to play a game on the electronic gaming machine, the method comprising:

storing in an electronic memory connected to the electronic gaming device a plurality of presentations of a character in which at least some of the stored presentations include the character speaking at least one short phrase, the stored presentations differing from one another in at least one of appearance of the character and tone of voice of the character;

receiving currency at the electronic gaming machine via a physical item acceptor, the currency having a monetary value;

receiving a wager from the currency in response to actuation of an input device at the electronic gaming machine;

initiating play of a game at the electronic gaming machine in response to actuation of an input device at the electronic gaming machine;

tracking the random outcome of at least one game played on the electronic gaming machine;

generating a presentation of a character that includes the character speaking at least one short phrase as a function of the outcome of the at least one game; and presenting the generated presentation to the player of the electronic gaming device so that the character appears to be speaking to the player.

* * * * *